Jan. 21, 1941.  L. M. CLARK  2,229,442
CUSHIONING MECHANISM
Filed Nov. 14, 1939  3 Sheets-Sheet 1

INVENTOR
Everett M. Clark
BY
ATTORNEYS

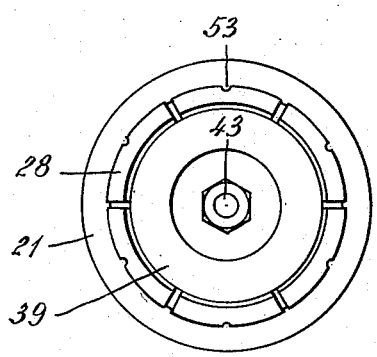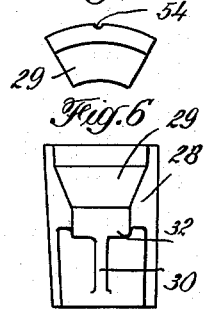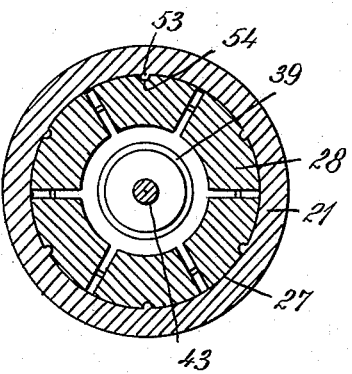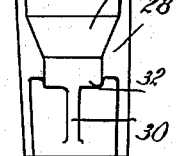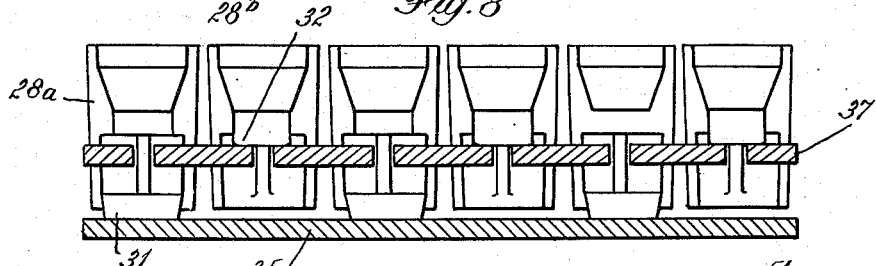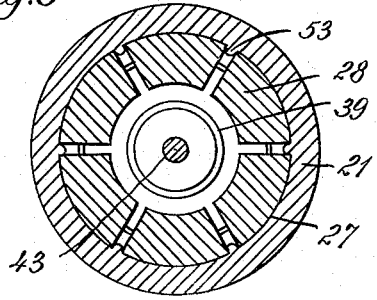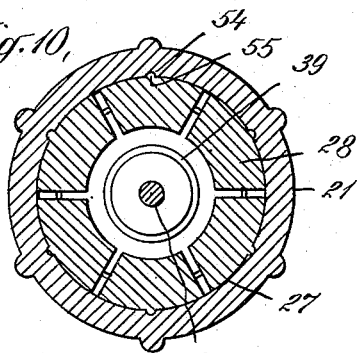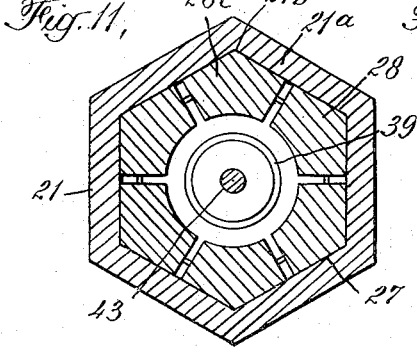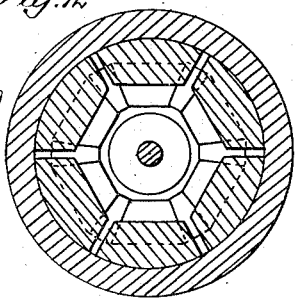

Jan. 21, 1941.   L. M. CLARK   2,229,442
CUSHIONING MECHANISM
Filed Nov. 14, 1939   3 Sheets-Sheet 3
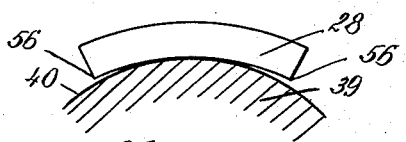
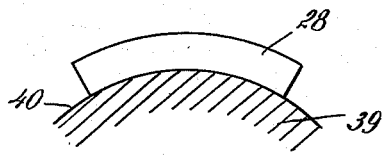
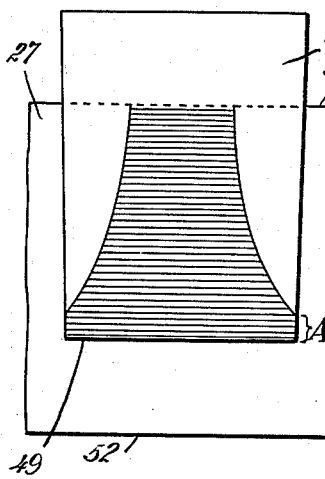
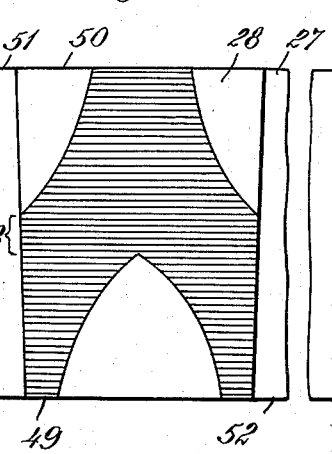
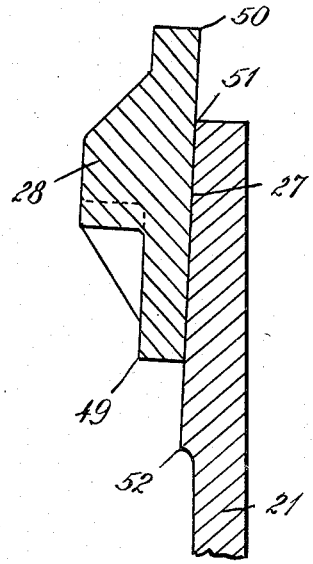
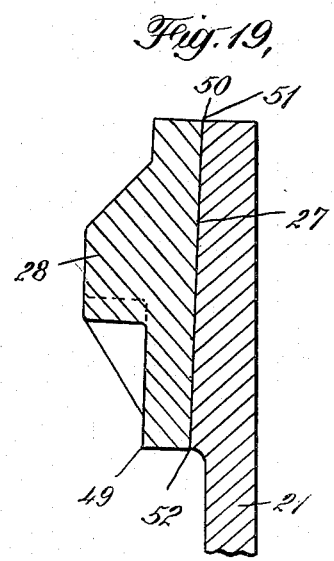
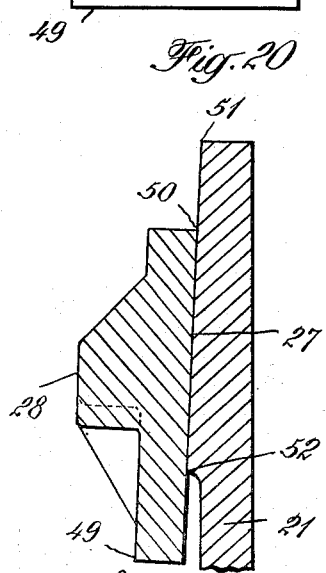
INVENTOR
Leverett M. Clark
BY
ATTORNEYS Patented Jan. 21, 1941

2,229,442

UNITED STATES PATENT OFFICE 2,229,442

CUSHIONING MECHANISM

Leverett M. Clark, Snyder, N. Y., assignor to Waugh Equipment Company, New York, N. Y., a corporation of Maine Application November 14, 1939, Serial No. 304,284

12 Claims. (Cl. 213—32)

This invention relates to a cushioning mechanism of the energy-absorbing type and is concerned more particularly with a novel friction cushioning mechanism which may be employed for various purposes, for example, as a draft gear for railway equipment or in connection with buffers, trucks, etc. The new cushioning mechanism has a wide range of utility, but since it may be employed to especial advantage as a draft gear, an embodiment of the invention suitable for that use will be illustrated and described for purposes of explanation.

As is well known, draft gears employed on railway vehicles to protect their structures and lading against shocks to which they are subject during switching and in train service should have high-energy absorption, sustained initial compression, and smooth and uniform action. Also, such a gear should be rugged and of as light weight as is possible without sacrifice of strength and durability. The new gear has the desired characteristics and, in addition, includes novel features of general utility in friction cushioning mechanisms that include friction generating shoes.

The new cushioning mechanism comprises a casing which encloses the operating elements of the device and is provided near one end, which is open, with an internal friction generating surface, ordinarily of frusto-conical form and of inwardly tapering diameter. Friction shoes lying side by side in a circular series engage the friction surface and are actuated by a plunger which extends within the group of shoes and projects outwardly beyond them, the shoes and plunger having wedging surfaces in contact. The shoes are divided into two groups with the members of the groups alternating, and the movement of the shoes into the casing is resisted by springs. One spring is seated at one end against a part of the housing, for example, the closed end thereof, and bears at its other end against a follower which is in contact with the shoes of one group only. Inward movement of the shoes of the second group is resisted by a second spring which acts at one end on the shoes and at the other against the follower above referred to. Preferably, a second follower is interposed between the shoes of the second group and the second spring.

In the preferred form of the device, the shoes have arcuate friction surfaces in contact with the friction surface of the casing, and the radius of the curvature of the arc of each shoe varies from end to end thereof. The shape of the friction surfaces of the shoes is such that in all positions of each shoe, there is a portion of its friction surface extending entirely across the face of the shoe, which is in contact with the friction surface of the casing. The formation of the contacting surfaces of the casing and shoes in this manner promotes uniform action of the gear in closing.

In order to insure that the shoes will be properly spaced and not crowd together, various expedients may be employed. Thus, the shoes and one of the followers through which spring pressure is transmitted to the shoes of one group only may be formed with inter-engaging parts which prevent circumferential movement of the shoes relative to the follower. Also, the friction surface of the casing may be formed with recesses in which portions of the friction surfaces of the shoes are received, the shape of the recesses and shoes being such that relative circumferential movement of the shoes is prevented.

The wedging surface on the plunger may be frusto-conical and the wedging surfaces on the shoes of corresponding arcuate shape. When that construction is employed, the radii of curvature of the wedging surface of each shoe are preferably such that the shoes make full contact with the plunger only when the gear is released. When the gear is partly or fully closed and the shoes have been moved inwardly relatively to the plunger and casing, each shoe makes contact with the plunger only over a central longitudinal area on the arcuate surface of the shoe. With this arrangement, no situation arises in which contact in any plane between a shoe and the plunger is at the side edges of the shoe only and the undesirable gripping effect which would result from such contact is avoided by the construction above described. If desired, however, the plunger may have a polygonal cross-section with flat wedging surfaces and, in that case, the wedging surfaces in the shoes are also flat.

In the new gear, six shoes are preferably employed in two groups of three each, and each spring resists the inward movement of three shoes only. As the shoes of each group make a three-point contact with the friction surface of the casing, all of the shoes take part equally in the friction generating action.

For a better understanding of the invention, reference may be had to the accompanying drawings in which:

Fig. 3 is an end view of the gear illustrated in Fig. 1;

Fig. 4 is a sectional view on the line 4—4 of Fig. 1;

Fig. 5 is an end view of one of the shoes;

Fig. 6 is a view in elevation of the inner face of the shoe of Fig. 5;

Fig. 7 is a view of the end of the shoe opposite to that illustrated in Fig. 5;

Fig. 8 is a developed view showing the arrangement of the shoes and the followers;

Figure 1:
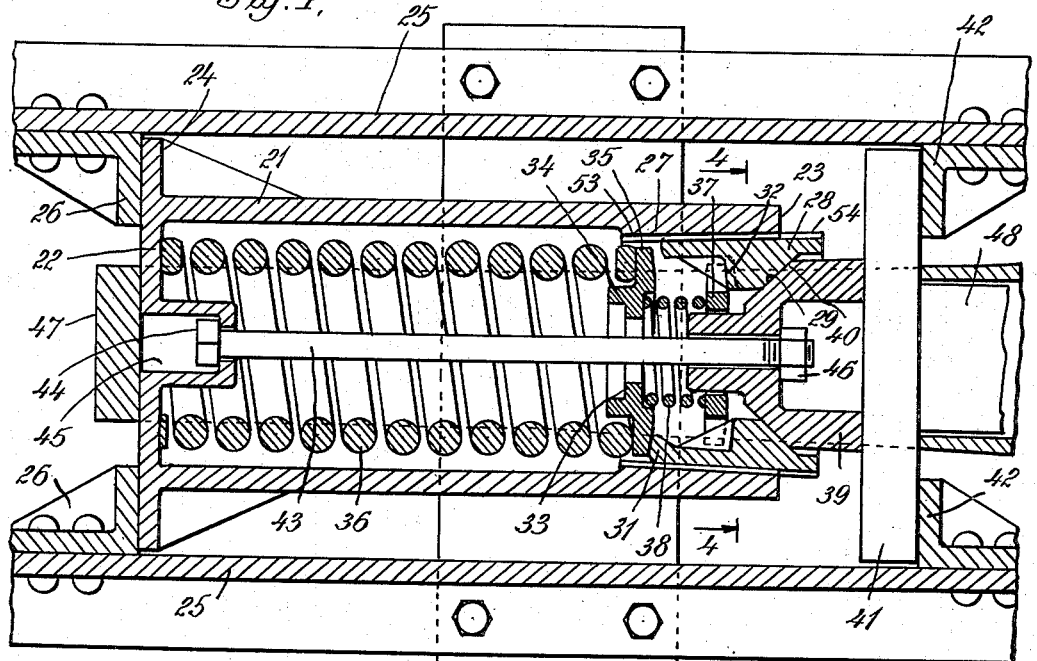
Fig. 1 is a longitudinal cross-section of the gear installed in a railway vehicle, the gear being shown in released condition.
Figure 2:
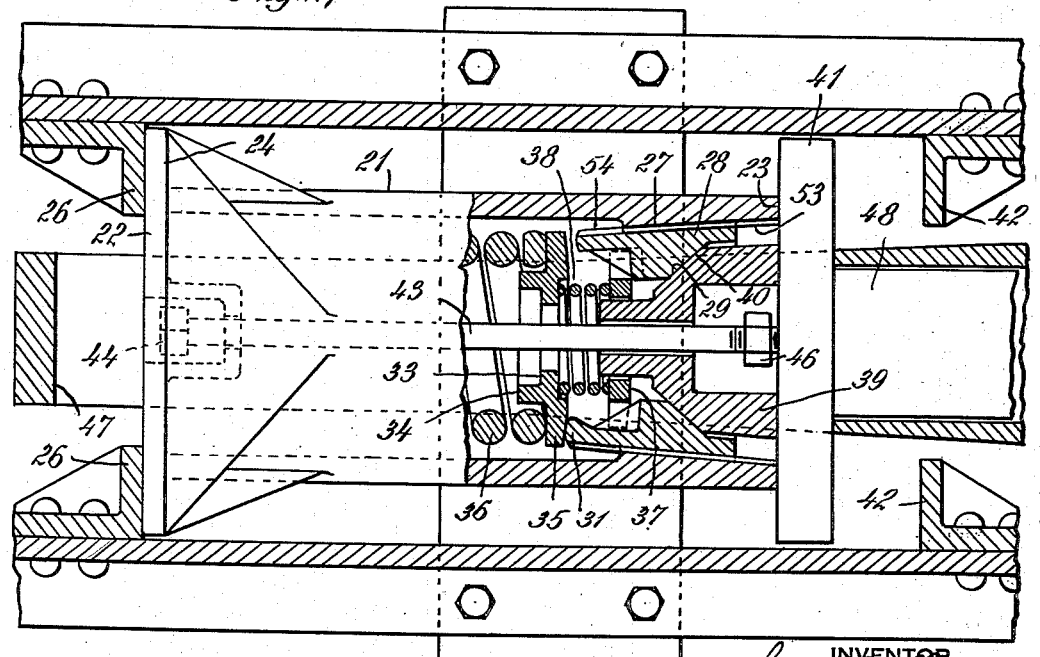
Fig. 2 is a view generally similar to Fig. 1, but with certain of the parts shown in elevation and the gear illustrated in closed condition.

Figs. 9, 10, and 11 are views similar to Fig. 4 showing alternative constructions;

Fig. 12 is a transverse sectional view through a modified form of actuating plunger and the shoes used therewith;

Figs. 13 and 14 are fragmentary end views illustrating the contact between the wedging surfaces of the shoes and plunger with the gear at full closure and released, respectively;

Figs. 15, 16, and 17 are diagrammatic elevational views showing the areas of contact between a shoe and the friction surface of the casing in different positions of the shoe; and Figs. 18, 19, and 20 are longitudinal sectional views through a shoe and the friction casing, these views corresponding to Figs. 15, 16, and 17, respectively, and showing the positions of the shoes in which the contacts of the preceding figures are made.

The cushioning device of the invention is illustrated in the drawings in the form of a draft gear which includes a casing 21 which is preferably of cylindrical shape and is formed with a closed end 22 and an open end 23. At its closed end, the casing is provided with a flange 24 which may be of generally rectangular shape and, as installed in a railway vehicle, the gear lies in a draft pocket between longitudinal sills 25 of the vehicle, with the flange 24 engaging draft stops 26 secured to the inner faces of the sills in the usual manner. Within its open end 23, the casing is formed with an internal friction generating surface 27 which may be and preferably is of frusto-conical formation. This surface is of sufficiently large area to provide the necessary cushioning capacity without undue abrasion and the inward taper of the surface provides the proper rate of increase in capacity during operation of the device.

Within the casing at the open end are friction shoes 28, each of which has an arcuate working surface in contact with the friction surface 27 of the casing. On its inner face, each shoe has a transverse rib shaped to provide a wedging surface 29, and the rib is stiffened by a strengthening rib 30 extending lengthwise of the shoe. The shoes are of two forms, the shoes 28a of one type having extensions 31 at one end, while the shoes 28b of the other type have extensions 32 from one surface of the transverse rib. In the preferred form of the device, there are six shoes, three of each kind, and shoes of the two kinds are arranged in alternation.

Within the casing at the ends of the shoes is a follower 33, which is of circular form and has a central hub 34 from which extends a peripheral flange 35. The flange 35 makes contact with the extensions 31 on the shoes 28a (Fig. 8), but is out of contact with the ends of shoes 28b. A spring 36 inside the casing is seated at one end against a part of the casing, as, for example, the closed end 22, and at its other end against the face of flange 35 opposite to that with which the shoes 28a are in contact. Spring 36 acts through the follower to resist the inward movement of the shoes 28a, and the resistance offered by the spring increases as the spring is compressed.

Lying within the group of shoes is a second follower 37 which has the form of a flat ring and is provided with radial cut-outs through which extend the strengthening ribs 30 of the shoes. The follower 37 lies in contact with the extensions 32 from the transverse rib of each shoe 28b, and interposed between the followers 33 and 37 is a spring 38 which is smaller and offers less resistance than the spring 36. As all the shoes move into the casing together and the distance between followers 33 and 37 remains the same at all times, the resistance to inward movement of the shoes 28b offered by spring 38 is constant.

Extending within the group of shoes is an actuating plunger 39 which is formed with a wedging surface 40 contacting with the similar surfaces 29 on the shoes. The plunger projects beyond the ends of the shoes and makes contact with a follower block 41, which, in the normal or released condition of the gear, is in contact with draft stops 42 secured to the sills 25 at the other end of the draft pocket. Outward movement of the plunger is limited by a bolt 43 which passes through the closed end 22 of the casing, the follower 34, and the plunger, the head 44 of the bolt lying in a socket 45 formed in the closed end of the casing while the nut 46 on the bolt lies within the hollow interior of the plunger. A yoke 47, illustrated as of the vertical type, encircles the gear and follower block 41, and the yoke is connected in the usual manner to the shank 48 of the coupler of the vehicle.

As illustrated, the friction surface 27 of the casing is of tapering diameter and the radius of curvature of the arcuate friction surface of each shoe decreases from the outer end of the shoe to the inner. The radii of curvature of the shoes and friction surface are so selected that in all positions, each shoe has a portion of its working face extending entirely across that face which is in contact with the casing surface. Thus, as illustrated in Figs. 15 to 20, when the shoe 28 is in its outermost position (Fig. 15) with the gear fully released, the radius of curvature of the working surface of the shoe at the inner end 49 of the latter is the same as that of the adjacent area of the casing surface 27. The area of contact between the shoe and casing surface is indicated by the shading in Fig. 15 and this area includes a band indicated by the bracket A which extends entirely across the shoe.

When the gear is partially closed and the outer ends of the shoes lie flush with the outer end of the casing (Fig. 16), the central transverse portion of each shoe has the same radius of curvature as that of the adjacent surface of the casing and the area of contact between the shoe and casing is indicated by the shading in Fig. 16. This area includes the transverse band, indicated by bracket B, which extends entirely across the face of the shoe. When the gear is fully closed, each shoe lies in a position in which the radius of curvature of its working face adjacent the outer end is the same as that of the portion of the casing adjacent to which that end of the shoe lies. Contact between the shoe and casing extends over the area indicated by the shading in Fig. 17, and this area includes a band extending entirely across the shoe at its outer end.

As an example of the radii of curvature of the shoe and friction surface which will give the desired results, the following may be given. At the outer end 50, each shoe may have a radius of 3.67", and the radius may be 3.57" at the inner end 49. The radius of curvature of the casing surface at the outer end 51 may then be 3.75", and the radius of the shoe in a plane through the end 51 of the casing may be 3.64". The radius of the casing surface in a plane through the inner end 49 of the shoe may then be 3.57", the same as that of the shoe, and this insures the presence of the band of contact A at the inner end 49 of the shoe, when the gear is released.

With the gear in its partially closed condition, illustrated in Figs. 16 and 19, the radius of curvature of the shoe in the transverse median plane may be 3.62" and that of the casing surface may be the same, so that the band of contact B is established. At the inner end 52 of the casing surface, the radius may be 3.49", while that of the inner end 49 of the shoe remains 3.57". With those dimensions, the area of contact between the shoe and casing is illustrated by the shaded area in Fig. 16, this area including transverse band B extending fully across the shoe.

When the shoe is in its inmost position with the gear fully closed, the radius of curvature of the casing in a plane through the end 50 of the shoe is 3.67", which is the same as that of the shoe adjacent the end 50. In a transverse plane through the end 52 of the casing surface, the radius of curvature of the shoe may be 3.60" and, since the radius of the casing in that plane is 3.49", the contact between the shoes and casing at the inner end of the casing will be as illustrated in Fig. 17, and full contact between the shoe and contact extending entirely across the shoe will be only that of the band C.

In draft gears as constructed heretofore, the curvatures of the working surfaces of the shoes and of the friction surface of the casing have been such that full contact with the casing over the entire face of the shoes is established only when the shoes are in their innermost position with the gear fully closed. As a result, the areas of contact between the parts in the released and partially closed conditions of the gear are narrow bands extending lengthwise of the shoes. In such gears, the contact at release is over the smallest area of each shoe and the area increases as closure is approached. Since the total pressures of the shoes against the casing surface are substantially uniform at all conditions of closure, wide variations occur in the contact pressure per unit area of the shoes on the casing. This high unit pressure applied by the shoes to the casing over relatively small areas of contact produces stiff gear action, and reduction of the initial resistance to shoe movement is objectionable because it leads to erratic action. Also, initial contact of the parts on the central areas only of the shoes causes undue wear.

With the shoes and casing formed in the manner illustrated in Figs. 15 to 20, inclusive, contact between each shoe and the casing occurs over an area extending entirely across the shoe under all conditions. As a consequence, wear is more uniformly distributed and the gear operates more smoothly and uniformly.

In the construction illustrated, the shoes are maintained at proper spacings relative to one another by reason of their strengthening ribs 30 being received in the cut-outs in the follower 37.

It is further desirable, however, to keep the shoes from shifting circumferentially relative to the casing and various expedients may be employed for the purpose. Preferably, the friction surface of the casing is formed with recesses receiving mating portions of the shoes. Thus, in the construction shown in Fig. 3, the casing has a plurality of ribs 53 extending lengthwise of the friction surface and each shoe is formed with a lengthwise channel 54 in its working face which receives one of the ribs. Those portions of the shoes lying on either side of the channel are thus received in recesses in the friction surface between adjacent ribs, and inter-engagement of the ribs and channel prevents the shoes from moving circumferentially of the casing during gear operation.

Instead of forming the shoes with lengthwise channels, the ribs 53 on the casing (Fig. 9) may be so formed that each shoe 28 lies between a pair of adjacent ribs, or the channels may be formed in the friction surface of the casing, as indicated at 54, and the shoes may be formed with lengthwise ribs 55 which enter the channels. Instead of any of the expedients described, the casing may be made of polygonal cross-section, as shown in Fig. 11. The casing 21a there illustrated is of hexagonal section and each of the shoes 28c is formed to make contact with surfaces of the casing lying on both sides of an angle 21b thereof.

Ordinarily the wedging surface 40 of the plunger is of frusto-conical shape and the wedging surface of each shoe has such radii of curvature that the shoe makes full contact over its wedging surface with the plunger when the gear is in released condition. When the shoes and plunger are given this form, the contact between them is initially as illustrated in Fig. 14, where it will be noted that each shoe engages the plunger over the entire arcuate wedging surface of the shoe. As the gear closes and the shoe moves inwardly relatively to the plunger, the contact between shoe and plunger is only over the deepest portion of the concavity in the shoe, as shown in Fig. 13, and the lateral edges 56 of the shoe are free of the plunger. With the arrangement described, gripping of the plunger by the shoes is avoided.

If desired, the plunger may have a wedging surface of polygonal cross-section, as illustrated in Fig. 12 and with that construction, the wedging surfaces of the shoes are flat and no difficulty from gripping arises.

The new gear is superior to prior similar gears in that it may be so constructed as to have the same strength and durability and at the same time be of lighter weight. In prior gears in which inward movement of the friction shoes is resisted by one or more springs, the springs are of substantial weight and are an important item in the cost of manufacture. In the new gear, only one heavy spring is employed and the second spring is much lighter and of substantially lower cost than the first. The use of the two springs in the construction described also permits variation in the characteristics of the gear.

In the release condition of the new gear, the minimum pressure of the spring 36 is equal to and preferably somewhat greater than that of the spring 38. The effective pressure of spring 36 against the shoes 28a is then equal to the pressure of the spring 36 less than of the spring 38, since the springs work against one another. Because the springs thus tend to balance one another, the effective pressure applied to the shoes 28a may be any value from zero upward, as desired. During gear closure, the resistance offered to the inward movement of shoes 28a increases as spring 36 is compressed, while the resistance to the inward movement of shoes 28b remains constant. By proper choice of the two springs, numerous variations in the characteristics of the draft gear may be obtained, as may be desired for particular conditions of use.

Ordinarily the casing of the new gear has a friction surface of uniform taper resulting from the formation of the surface either by machine boring or hot-slugging. The shoes are then formed with non-uniform taper by forging operations and as a result, full transverse contact between some part of each shoe and the casing surface is obtained in all positions of the shoe. The actual areas of contact between the shoes and casing surface vary with the degree of closure, and the formation of the casing surface and shoes, as described, results in reduction in wear and improved closure action.

While I have described the new cushioning mechanism as including shoes with a non-uniform taper and as being provided with various means by which the shoes can be kept from circumferential movement relative to the frusto-conical friction surface of the casing, it is to be understood that these features are of general applicability. Also, the formation of the shoes in such manner that they do not grip the frusto-conical wedging surface of the plunger is an expedient which may be employed in gears of various types.

I claim:

1. In a cushioning mechanism, the combination of a casing, a series of friction shoes in the casing with the shoes arranged in two groups, the members of the groups alternating in the series, a central actuating plunger extending within the series of shoes, the plunger and shoes having cooperating wedging surfaces, means within the casing offering increasing resistance to the inward movement of the shoes of one group only, means within the casing offering a constant resistance to the inward movement of the shoes of the second group only, and means limiting the movement of the plunger out of the casing.

2. In a cushioning mechanism, the combination of a casing, a series of friction shoes in the casing with the shoes arranged in two groups, the members of the groups alternating in the series, a central actuating plunger extending within the series of shoes, the plunger and shoes having cooperating wedging surfaces, spring means within the casing offering increasing resistance to the inward movement of the shoes of one group only, spring means within the casing offering a constant resistance to the inward movement of the shoes of the second group only, and means limiting the movement of the plunger out of the casing.

3. In a cushioning mechanism, the combination of a casing, a series of friction shoes in the casing with the shoes arranged in two groups, the members of the groups alternating in the series, a central actuating plunger extending within the series of shoes, the plunger and shoes having cooperating wedging surfaces, a member within the casing contacting with the shoes of one group only, a spring acting at one end on a part of the casing and at the other on said member to resist inward movement of the member and the shoes with which it is in contact, a second spring acting at one end on said member and at the other on the shoes of the other group only to oppose inward movement of said shoes, and means limiting the movement of the plunger out of the casing.

4. In a cushioning mechanism, the combination of a casing, a series of friction shoes in the casing with the shoes arranged in two groups, the members of the groups alternating in the series, a central actuating plunger extending within the series of shoes, the plunger and shoes having cooperating wedging surfaces, a member within the casing contacting with surfaces of the shoes of one group only, a spring acting at one end on a part of the casing and at the other on said member to oppose inward movement of the member and the shoes in contact therewith, a second spring acting at one end on said member and at the other on different surfaces of the shoes of the other group only to oppose inward movement of said shoes, and means limiting the movement of the plunger out of the casing.

5. In a cushioning mechanism, the combination of a casing, a series of friction shoes in the casing with the shoes arranged in two groups, the members of the groups alternating in the series, a central actuating plunger extending within the series of shoes, the plunger and shoes having cooperating wedging surfaces, a follower within the casing contacting with the shoes of one group only, a second follower within the casing contacting with the shoes of the other group only, and a pair of springs resisting the inward movement of the shoes, one spring acting against a part of the housing and one follower and the other spring acting on both followers, and means limiting the movement of the plunger out of the casing.

6. In a cushioning mechanism, the combination of a casing, a set of six friction shoes in the casing, the shoes being arranged in two groups with the members of the groups alternating, a central actuating plunger extending within the series of shoes, the plunger and shoes having cooperating wedging surfaces, means within the casing offering increasing resistance to the inward movement of the shoes of one group only, means within the casing offering a constant resistance to the shoes of the second group only, and means limiting the movement of the plunger out of the casing.

7. A cushioning mechanism which comprises a casing, a series of friction shoes within the casing in contact with an internal friction surface therein, the shoes being arranged in two groups with the members of the groups in alternation, a follower within the casing engaging the shoes of one group only, a spring within the casting acting at one end on a part of the casing and at the other end on said follower, a second spring acting on the follower and on the members of the shoes of the other group only, and means for limiting the outward movement of the plunger, the pressure exerted by the first spring when the plunger is in its outermost position being not less than the pressure exerted by the second spring.

8. In a cushioning mechanism, the combination of a casing having an internal friction surface of generally frusto-conical shape, a group of friction shoes in the casing having curved outer surfaces in contact with the friction surface of the casing, a plunger extending within the group of shoes, the plunger and shoes having cooperating wedging surfaces, spring means within the casing offering resistance to the inward movement of the shoes, and means limiting the movement of the plunger out of the casing, the shapes of the friction surface of the casing and the outer surfaces of the shoes being such that in all positions of the shoes each shoe has a portion extending entirely across the outer surface thereof which is in full contact with the friction surface of the casing.

9. A cushioning mechanism which comprises a casing having a friction surface of circular cross section and tapering diameter, a plurality of friction shoes having outer surfaces in contact with the friction surface of the casing, said surfaces on the shoes being of arcuate cross section and of decreasing radius of curvature from one end of the shoes to the other, the rate of decrease in the radius of curvature of the shoes being different from the taper in the diameter of the friction surface of the casing, a plunger within the group of shoes having wedging surfaces in contact with similar surfaces on the shoes, spring means resisting movement of the shoes into the casing along the friction surface of the casing, and means for limiting the outward movement of the plunger from the casing, each shoe having a portion of its arcuate surface extending entirely across the latter in full contact with the friction surface of the casing, in all positions of the shoes relative to the casing.

10. In a friction cushioning mechanism, a casing having an internal friction surface, a plurality of shoes having outer surfaces in contact with said friction surface, a plunger within the group of shoes having wedging surfaces in contact therewith, the wedging surfaces of the plunger and shoes being of curved cross-section and the surfaces on the shoes being of such radii of curvature that full contact between the surfaces occurs only when the shoes are in their outer position relative to the plunger and casing and the contact decreases as the shoes are moved inwardly, spring means within the casing resisting the inward movement of the shoes, and means limiting the outward movement of the plunger.

11. In a cushioning mechanism, the combination of a casing having an internal friction surface, a series of friction shoes in the casing having outer surfaces in contact with the friction surface of the casing, the shoes being arranged in two groups with the members of the groups in alternation, an actuating plunger extending within the series of shoes, the plunger and shoes having cooperating wedging surfaces, means within the casing offering increasing resistance to the inward movement of the shoes of one group only, means within the casing offering a constant resistance to the inward movement of the shoes of the second group only, and means limiting the movement of the plunger out of the casing, the casing and shoes having interengaging parts preventing the shoes from moving circumferentially of the casing during the inward and outward movements of the shoes.

12. In a cushioning mechanism, the combination of a casing having an internal friction surface, a series of friction shoes in the casing having outer surfaces in contact with the friction surface of the casing, the shoes being arranged in two groups with the members of the groups in alternation, an actuating plunger extending within the series of shoes, the plunger and shoes having cooperating wedging surfaces, a member within the casing contacting with the shoes of one group only, spring means acting at one end on a part of the casing and at the other end on said member to resist inward movement of the member and the shoes with which it is in contact, a second spring means acting at one end on said member and at the other end on the shoes of the second group only to oppose inward movement of said shoes, and means limiting the movement of the plunger out of the casing, the casing and shoes having interengaging parts preventing the shoes from moving circumferentially of the casing during the inward and outward movements of the shoes.

LEVERETT M. CLARK.